United States Patent
Hagio et al.

(10) Patent No.: US 10,093,547 B2
(45) Date of Patent: Oct. 9, 2018

(54) METHOD FOR PRODUCING DDR TYPE ZEOLITE CRYSTALS AND METHOD FOR PRODUCING DDR TYPE ZEOLITE MEMBRANE

(71) Applicant: NGK Insulators, Ltd., Nagoya (JP)

(72) Inventors: Takeshi Hagio, Nagoya (JP); Kenji Yajima, Nagoya (JP); Makiko Ichikawa, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 198 days.

(21) Appl. No.: 14/863,560

(22) Filed: Sep. 24, 2015

(65) Prior Publication Data

US 2016/0009564 A1    Jan. 14, 2016

Related U.S. Application Data

(63) Continuation of application No. PCT/JP2014/058511, filed on Mar. 26, 2014.

(30) Foreign Application Priority Data

Mar. 29, 2013  (JP) ................................. 2013-075369

(51) Int. Cl.
| | | |
|---|---|---|
| *C01B 39/48* | (2006.01) | |
| *C01B 37/02* | (2006.01) | |
| *B01D 53/22* | (2006.01) | |
| *B05D 1/18* | (2006.01) | |

(52) U.S. Cl.
CPC ............ *C01B 39/48* (2013.01); *B01D 53/228* (2013.01); *B05D 1/18* (2013.01); *C01B 37/02* (2013.01); *B01D 2053/221* (2013.01)

(58) Field of Classification Search
None
See application file for complete search history.

(56) References Cited

U.S. PATENT DOCUMENTS

| | | | |
|---|---|---|---|
| 4,698,217 A | 10/1987 | Valyocsik | |
| 5,958,367 A * | 9/1999 | Ying | C01B 13/32 423/701 |
| 2011/0160039 A1* | 6/2011 | Himeno | B01J 29/70 502/4 |
| 2011/0287261 A1 | 11/2011 | Yajima et al. | |
| 2011/0301017 A1 | 12/2011 | Niino et al. | |
| 2012/0196739 A1 | 8/2012 | Uchikawa et al. | |
| 2012/0213696 A1 | 8/2012 | Uchikawa et al. | |
| 2012/0247336 A1 | 10/2012 | Zhou et al. | |
| 2012/0272826 A1* | 11/2012 | Uchikawa | B01D 53/228 96/8 |

FOREIGN PATENT DOCUMENTS

| | | |
|---|---|---|
| CN | 101759573 A | 6/2010 |
| EP | 2 489 636 A1 | 8/2012 |
| JP | 2007-254409 A | 10/2007 |
| JP | WO 2011105511 A1 * | 9/2011 ........... B01D 53/228 |
| WO | 2010/090049 A1 | 8/2010 |
| WO | 2011/046016 A1 | 4/2011 |
| WO | 2011/070879 A1 | 6/2011 |

OTHER PUBLICATIONS

Extended European Search Report (Application No. 14774142.5) dated Oct. 14, 2016.
H. Gies, Journal of Inclusion Phenomena 2, (1984), pp. 275-278.
A. Stewart, et al., "Synthesis and Characterisation of Crystalline Aluminosilicate Sigma-1," Studies in Surface Science and Catalysis, vol. 37 (1988), pp. 57-64.
Canan Gücüyener, et al., "Facile Synthesis of the DD3R Zeolite: Performance in the Adsorptive Separation of Buta-1,3-diene and But-2-ene Isomers," Journal of Materials Chemistry, 2011, vol. 21, pp. 18386-18397.
Yang Qi-Liang, et al., "Synthesis of DDR-Type Zeolite in Fluoride Medium," Chinese Journal of Inorganic Chemistry, vol. 25 No. 2, Feb. 2009, pp. 191-194 (with English translation).
International Search Report and Written Opinion (Application No. PCT/JP2014/058511) dated Jul. 1, 2014.
E. Narita, "A Kinetic Study of the Crystallization of Zeolite ZSM-5 in Organic Solvent / Water Mixture Systems," Journal of Crystal Growth, vol. 78, Issue. 1, Oct. 1986, pp. 1-8.
Chinese Office Action (Application No. 201480019484.2) dated Jul. 7, 2017 (with English translation).
European Office Action, European Application No. 14774142.5, dated Dec. 13, 2017 (7 pages).

* cited by examiner

*Primary Examiner* — Shamim Ahmed
*Assistant Examiner* — Bradford M Gates
(74) *Attorney, Agent, or Firm* — Burr & Brown, PLLC

(57) ABSTRACT

Provided is a method for producing a DDR type zeolite crystal, the method including: a raw material solution preparing step of preparing a raw material solution by mixing at least silica, water, an organic solvent, and 1-adamantanamine that is a structure directing agent; and a DDR type zeolite crystal generating step of generating a DDR type zeolite crystal by performing a heating treatment on the raw material solution, in which the organic solvent is an organic solvent containing no amine, and the raw material solution is a raw material solution containing no PRTR substance.

9 Claims, No Drawings

METHOD FOR PRODUCING DDR TYPE ZEOLITE CRYSTALS AND METHOD FOR PRODUCING DDR TYPE ZEOLITE MEMBRANE

BACKGROUND OF THE INVENTION

1. Field of the Invention

The present invention relates to a method for producing a DDR type zeolite crystal and a method for producing a DDR type zeolite membrane. More specifically, the invention relates to a method for producing a DDR type zeolite crystal and a method for producing a DDR type zeolite membrane in which a structure directing agent can be easily dissolved without using a substance with high environmental burdens (PRTR substance) in a raw material solution preparing step.

2. Description of Related Art

Zeolite is used as a catalyst, a catalyst carrier, an adsorbent, and the like. In addition, a zeolite membrane formed on the surface of a porous support made of metal or ceramic utilizes a molecular sieve function of zeolite, and becomes popular as a gas separation membrane or a pervaporation membrane.

As zeolite, there are many kinds such as LTA, MFI, MOR, AFI, FER, FAU, and DDR depending on their crystal structures. Among these, a DDR (Deca-Dodecasil 3R) type zeolite is a crystal having silica as a main component. Pores thereof are formed by a polyhedron including an oxygen 8-membered ring. Further, it is known that the pore diameter of the oxygen 8-membered ring is 4.4×3.6 angstrom. These are described in "W. M. Meier, D. H. Olson, Ch. Baerlocher, Atlas of zeolite structure types, Elsevier (1996)."

A DDR type zeolite has a relatively small pore diameter among zeolites and may be usable suitably as a molecular sieve membrane for low molecular gas such as carbon dioxide ($CO_2$), methane ($CH_4$), or ethane ($C_2H_6$).

When such a DDR type zeolite is produced, generally, silica and "1-adamantanamine that is a structure directing agent" are dissolved in water to prepare a raw material solution and the raw material solution is subjected to the heating treatment to generate a DDR type zeolite crystal. At this time, since 1-adamantanamine is difficult to be dissolved in water, ethylenediamine, potassium fluoride, or the like is mixed in the raw material solution in order to accelerate the dissolving of 1-adamantanamine (for example, see Patent Document 1 and Non Patent Document 1). Further, mixing of ethylenediamine, potassium fluoride, or the like in the raw material solution is also intended to suppress the generation of other crystal phases.

However, ethylenediamine, potassium fluoride, or the like is a PRTR substance and has high environmental burdens. Incidentally, the PRTR substance indicates a target chemical substance in a PRTR (Pollutant Release and Transfer Register) system (PRTR system).

Further, a method in which a DDR type zeolite crystal and a DDR type zeolite membrane are tried to be produced without using a PRTR substance is disclosed (for example, see Patent Documents 2 and 3 and Non Patent Document 2).

However, in the production method of the related art without using a PRTR substance, there is a problem in that an extra operation is necessary or it is difficult to make a raw material solution uniform.

CITATION LIST

Patent Documents

[Patent Document 1] WO 2010/90049 A
[Patent Document 2] WO 2011/46016 A
[Patent Document 3] U.S. Pat. No. 4,698,217

Non Patent Documents

[Non Patent Document 1] H. Gies, Journal of Inclusion Phenomena 2, (1984)
[Non Patent Document 2] A. Stewart, D. W. Johnson and M. D. Shannon, Studies in Surface Science and Catalysis vol. 37, (1988) 57-64

SUMMARY OF THE INVENTION

Problem to be Solved by the Invention

The invention has been made in view of such problems of the related art. The invention is a method for producing a DDR type zeolite crystal and a method for producing a DDR type zeolite membrane in which a structure directing agent can be easily dissolved without using a substance with high environmental burdens (PRTR substance) in a raw material solution preparing step.

Means for Solving the Problem

According to the invention, there are provided the following method for producing a DDR type zeolite crystal and method for producing a DDR type zeolite membrane.

According to a first aspect of the present invention, a method for producing a DDR type zeolite crystal is provided, the method including: a raw material solution preparing step of preparing a raw material solution by mixing at least silica, water, an organic solvent, and 1-adamantanamine that is a structure directing agent; and a DDR type zeolite crystal generating step of generating a DDR type zeolite crystal by performing a heating treatment on the raw material solution, in which the organic solvent is an organic solvent containing no amine, and the raw material solution is a raw material solution containing no PRTR substance.

According to a second aspect of the present invention, the method for producing a DDR type zeolite crystal described in the first aspect is provided, in which the organic solvent contains 70 mol % or more of a lower alcohol, acetone, or a mixture of a lower alcohol and acetone.

According to a third aspect of the present invention, the method for producing a DDR type zeolite crystal described in the second aspect is provided, in which the organic solvent is an alcohol having 3 or less carbon atoms.

According to a fourth aspect of the present invention, the method for producing a DDR type zeolite crystal described in the second or third aspects is provided, in which the lower alcohol is a monohydric or dihydric alcohol.

According to a fifth aspect of the present invention, the method for producing a DDR type zeolite crystal described in any one of the second to fourth aspects is provided, in which the lower alcohol is ethanol or ethylene glycol.

According to a sixth aspect of the resent invention the method for producing a DDR type zeolite crystal described in any one of the first to fifth aspects is provided, in which a value of the ratio of the content expressed in terms of mole of the water in the raw material solution to the content expressed in terms of mole of the organic solvent in the raw material solution is 6 or more.

According to a seventh aspect of the present invention, the method for producing a DDR type zeolite crystal described in the sixth aspect is provided, in which a value of the ratio of the content expressed in terms of mole of the water in the raw material solution to the content expressed in terms of mole of the organic solvent in the raw material solution is 6 to 100.

According to an eighth aspect of the present invention, the method for producing a DDR type zeolite crystal described in any one of the first to seventh aspects is provided, in which a value of the ratio of the content expressed in terms of mole of the silica in the raw material solution to the content expressed in terms of mole of the organic solvent in the raw material solution is 6 or less.

According to a ninth aspect of the present invention, the method for producing a DDR type zeolite crystal described in any one of the first to eighth aspects is provided, in which in the raw material solution preparing step, the 1-adamantanamine that is a structure directing agent is dissolved in the organic solvent to prepare an organic solvent containing 1-adamantanamine dissolved therein, and the organic solvent containing 1-adamantanamine dissolved therein, the silica, and the water are mixed.

According to a tenth aspect of the present invention, the method for producing a DDR type zeolite crystal described in any one of the first to ninth aspects is provided, in which in the DDR type zeolite crystal generating step, a DDR type zeolite seed crystal is dispersed in the raw material solution and then the raw material solution is subjected to the heating treatment.

According to an eleventh aspect of the present invention, a method for producing a DDR type zeolite membrane is provided, the method including: a raw material solution preparing step of preparing a raw material solution by mixing at least silica, water, an organic solvent, and 1-adamantanamine that is a structure directing agent; and a membrane forming step of immersing a support with a DDR type zeolite seed crystal adhered on the surface thereof in the raw material solution and then performing hydrothermal synthesis to form a DDR type zeolite membrane on the surface of the support, in which the organic solvent is an organic solvent containing no amine, and the raw material solution is a raw material solution containing no PRTR substance.

Effect of the Invention

In the method for producing a DDR type zeolite crystal of the invention, since an "organic solvent containing no amine" is mixed in the raw material solution preparing step, 1-adamantanamine that is a structure directing agent is easily dissolved by the "organic solvent containing no amine." In addition, since the "organic solvent containing no amine" used for accelerating the dissolving of 1-adamantanamine does "not contain amine," it is possible to dissolve 1-adamantanamine without using ethylenediamine or the like that is a PRTR substance. Further, since the raw material solution does not contain a PRTR substance, the method for producing a DDR type zeolite crystal of the invention is a production method in which a PRTR substance is neither incorporated nor released.

Similarly, according to the method for producing a DDR type zeolite membrane of the invention, since an "organic solvent containing no amine" is mixed in the raw material solution preparing step, 1-adamantanamine that is a structure directing agent is easily dissolved by the "organic solvent containing no amine." Further, since the "organic solvent containing no amine" used for accelerating the dissolving of 1-adamantanamine does "not contain amine," it is possible to dissolve 1-adamantanamine without using ethylenediamine or the like that is a PRTR substance. Furthermore, since the raw material solution does not contain a PRTR substance, the method for producing a DDR type zeolite membrane of the invention is a production method in which a PRTR substance is neither incorporated nor released.

DETAILED DESCRIPTION OF THE INVENTION

Hereinafter, modes for carrying out the invention will be described in detail. The invention is not limited to the following embodiments, and it should be understood that change, improvements, and the like may appropriately be made on the basis of knowledge of a person of ordinary skill in the art within the scope of not deviating from the gist of the invention.

(1) Method for Producing DDR Type Zeolite Crystal:

An embodiment of the method for producing a DDR type zeolite crystal of the invention includes a raw material solution preparing step and a DDR type zeolite crystal generating step. Further, the raw material solution preparing step is a step of preparing a raw material solution "by mixing at least silica, water, an organic solvent, and 1-adamantanamine that is a structure directing agent." Moreover, the DDR type zeolite crystal generating step is a step of generating a DDR type zeolite crystal by performing a heating treatment on the raw material solution. Further, the "organic solvent" is an organic solvent containing no amine, and the "raw material solution" is a raw material solution containing no PRTR substance.

As described above, in the method for producing a DDR type zeolite crystal of this embodiment, since the "organic solvent containing no amine" is mixed in the raw material solution preparing step, 1-adamantanamine that is a structure directing agent is easily dissolved by the "organic solvent containing no amine." Further, since the "organic solvent containing no amine" used for accelerating the dissolving of 1-adamantanamine does "not contain amine," it is possible to dissolve 1-adamantanamine without using ethylenediamine or the like that is a PRTR substance. Therefore, in the method for producing a DDR type zeolite crystal of this embodiment, the structure directing agent can be easily dissolved without using substances with high environmental burdens (PRTR substance) in the raw material solution preparing step.

Hereinafter, the method for producing a DDR type zeolite crystal of this embodiment will be specifically described for each step.

(1-1) Raw Material Solution Preparing Step:

In the method for producing a DDR type zeolite crystal of this embodiment, the raw material solution preparing step is a step of preparing a raw material solution by mixing at least silica, water, an "organic solvent containing no amine," and 1-adamantanamine that is a structure directing agent. Here, a PRTR substance is not contained in the raw material solution.

In the raw material solution preparing step, when the organic solvent is contained in the raw material solution, 1-adamantanamine that is a structure directing agent is easily to be dissolved. The mixing order when each component is mixed in the raw material solution is not particularly limited. However, when colloidal silica is used as a silica source, it is preferable that any one of colloidal silica and the organic solvent be mixed with water and then other components be mixed. In order to further accelerate the dissolving of 1-adamantanamine that is a structure directing agent, the following dissolving method is preferably performed. That is, it is preferable that 1-adamantanamine that is a structure directing agent be dissolved in the organic solvent to prepare an "organic solvent containing 1-adamantanamine dissolved therein" and then the "organic solvent containing 1-adamantanamine dissolved therein" and a "mixed solution of water and the silica source" be mixed. Since 1-adamantanamine (structure directing agent) is easily dissolved in the organic solvent, when 1-adamantanamine (structure directing agent) is dissolved in advance in the organic solvent, the dissolving of 1-adamantanamine can be more easily performed in the raw material solution preparing step.

In the raw material solution preparing step, the organic solvent contains a lower alcohol, acetone, or a mixture of a lower alcohol and acetone in an amount of preferably 70 mol % or more and more preferably 80 mol % or more. Further, the organic solvent is particularly preferably a lower alcohol, acetone, or a mixture of a lower alcohol and acetone. When a compound or mixture as described above is used as the organic solvent, 1-adamantanamine that is a structure directing agent is easily dissolved and thus a uniform raw material solution can be obtained. Since 1-adamantanamine is less likely to be dissolved in water, in order to make a raw material solution uniform, the organic solvent needs to have a function of "bringing 1-adamantanamine together with water." That is, the organic solvent needs to dissolve a structure directing agent and be dissolved in water. Since a lower alcohol has an alkyl group and an OH group, it satisfies the above conditions of dissolving a structure directing agent and being dissolved in water. In addition, since acetone has a polarity at a bonding part of "C═O" (carbonyl group), it satisfies the above conditions. In this specification, a "lower alcohol" means an alcohol having 5 or less carbon atoms. The lower alcohol contained in the organic solvent is preferably an alcohol having 3 or less carbon atoms. Further, the organic solvent is preferably an alcohol having 3 or less carbon atoms. Accordingly, 1-adamantanamine is more easily dissolved and thus a uniform raw material solution can be obtained. As the number of carbon atoms increases, hydrophobicity of the organic solvent increases and thus the organic solvent is difficult to be dissolved in water. Further, as the number of carbon atoms increases and the structure becomes complicated, steric hindrance becomes great and thus it is speculated that this steric hindrance acts to hinder the contact of 1-adamantanamine and silica. For this reason, as the organic solvent, an alcohol having 3 or less carbon atoms and acetone are preferable. Further, the lower alcohol is preferably a monohydric or dihydric alcohol. When the organic solvent is a trihydric or higher-valent alcohol, the organic solvent is more easily to be dissolved in water. On the other hand, hydrogen bonding of water and the organic solvent increases and thus uniformity of a $SiO_2$ source in the raw material solution may be lowered in some cases. For this reason, by using a dihydric or lower-valent alcohol as the organic solvent, the bonding property of the organic solvent and water is adjusted and the non-uniformness in raw material solution is prevented. Here, the "$SiO_2$ source" is a substance having a bond of "Si—O" in the raw material solution, and examples thereof may include silica sol, organic silica, silicon alkoxide (for example, tetramethyl orthosilicate or tetraethyl orthosilicate), and sodium silicate. Further, as the monohydric alcohol, methanol, ethanol, propanol, butanol, or pentanol is preferable. As the dihydric alcohol, ethylene glycol, propylene glycol (for example, 1,2-propanediol), butylene glycol (for example, 1,2-butanediol), or pentylene glycol (for example, 1,2-pentanediol) is preferable. In addition, the lower alcohol to be mixed in the organic solvent is preferably ethanol or ethylene glycol.

The value of the ratio of the "content expressed in terms of mole" of the water in the raw material solution to the "content expressed in terms of mole" of the organic solvent in the raw material solution is preferably 6 or more, more preferably 6 to 100, and particularly preferably 20 to 100. When the value of the ratio of the content (mole) of the water in the raw material solution to the content (mole) of the organic solvent in the raw material solution (water/organic solvent) is less than 6, the silica source may be less likely to be uniformly mixed in some cases. When the value of the ratio (water/organic solvent) is less than 20, gelation occurs in the DDR type zeolite crystal generating step, and amorphous components may be mixed in a product in some cases.

Further, the value of the ratio of the "content expressed in terms of mole" of the silica ($SiO_2$) in the raw material solution to the "content expressed in terms of mole" of the organic solvent in the raw material solution is preferably 6 or less, more preferably 1 to 6, and particularly preferably 1 to 4. When the value of the ratio of the content (mole) of the silica in the raw material solution to the content (mole) of the organic solvent in the raw material solution (silica/organic solvent) is less than 1, gelation occurs in the DDR type zeolite crystal generating step, and amorphous components may be mixed in a product in some cases. When the value of the ratio of the content (mole) of the silica in the raw material solution to the content (mole) of the organic solvent in the raw material solution exceeds 6, the silica source may be less likely to be uniformly mixed in some cases.

Further, the value of the ratio of the "content expressed in terms of mole" of silica ($SiO_2$) in the raw material solution to the "content expressed in terms of mole" of alumina ($Al_2O_3$) in the raw material solution is preferably 50 or more, more preferably 70 or more, and particularly preferably 100 or more. When the value of the ratio is less than 50, the DDR crystal may be difficult to grow in some cases.

(1-2) DDR Type Zeolite Crystal Generating Step:

The DDR type zeolite crystal generating step is a step of generating a DDR type zeolite crystal by performing a heating treatment on the raw material solution. The temperature condition upon heating treatment of the raw material solution is preferably 150 to 220° C., more preferably 160 to 200° C., and particularly preferably 160 to 180° C. When the temperature is lower than 150° C., the DDR type zeolite crystal may be difficult to be generated in some cases. When the temperature is higher than 220° C., other crystal phases may be likely to be generated together with the DDR type zeolite crystal in some cases. The time for performing the heating treatment on the raw material solution is preferably 24 hours or longer, more preferably 36 hours or longer, and particularly preferably 48 hours or longer. When the time therefor is shorter than 24 hours, the DDR type zeolite crystal may not be sufficiently generated in some cases. Further, it is preferable that the raw material solution be subjected to the heating treatment in a stationary state.

In the DDR type zeolite crystal generating step, when the heating treatment is performed on the raw material solution after the DDR type zeolite seed crystal is dispersed in the raw material solution, the heating temperature can be decreased and the time for heating treatment can be further shortened. When the DDR type zeolite seed crystal is dispersed in the raw material solution, the temperature condition upon heating treatment of the raw material solution is preferably 100 to 200° C., more preferably 120 to 180° C., and particularly preferably 120 to 160° C. When the temperature is lower than 100° C., the crystallinity of the DDR type zeolite crystal may be lowered in some cases. When the temperature is higher than 200° C., other crystal phases may be likely to be generated together with the DDR type zeolite crystal in some cases. The time for performing the heating treatment on the raw material solution is preferably 4 hours or longer, more preferably 4 to 24 hours, and particularly preferably 4 to 16 hours. When the time therefor is shorter than 4 hours, the DDR type zeolite crystal may not be sufficiently generated in some cases. The content of the DDR type zeolite seed crystal in the raw material solution is preferably 0.003 to 10 mass %, more preferably 0.05 to 3 mass %, and particularly preferably 0.06 to 2 mass %. When the content thereof is less than 0.003 mass %, the dispersibility of the DDR type zeolite crystal may be lowered in some cases. When the content thereof is more than 10 mass %, the raw material is not pervaded and thus each DDR type zeolite crystal may not be sufficiently crystallized.

Further, it is preferable that the DDR type zeolite seed crystal contain 1-adamantanamine that is a structure directing agent. According to this, there are advantages that stability during the heating treatment is improved and the DDR type zeolite seed crystal can easily act as a seed crystal.

The DDR type zeolite seed crystal has an average particle diameter of preferably 30 to 300 μm, more preferably 50 to 250 μm, and particularly preferably 50 to 150 μm. When the average particle diameter is less than 30 μm, the DDR type zeolite seed crystal is difficult to be stored for a long period of time due to aggregation or the like in some cases, and a uniform DDR crystal may be difficult to be obtained in some cases. When the average particle diameter is more than 300 μm, the DDR type zeolite seed crystal is precipitated before the heating treatment and a uniform DDR crystal may not be obtained in some cases. The average particle diameter is a value measured by a dynamic light-scattering method.

The DDR type zeolite seed crystal has a specific surface area of preferably 50 to 500 m$^2$/g, more preferably 70 to 300 m$^2$/g, and particularly preferably 100 to 300 m$^2$/g. When the specific surface area is less than 50 m$^2$/g, the DDR type zeolite seed crystal is precipitated before the heating treatment and a uniform DDR crystal may not be obtained in some cases. When the specific surface area is more than 500 m$^2$/g, a uniform DDR crystal may not be obtained due to aggregation in some cases. The specific surface area is a value measured by a BET one-point method according to a flow method.

The method for producing a DDR type zeolite seed crystal is not particularly limited, and the DDR type zeolite seed crystal can be produced on the basis of a method for producing a seed crystal described in WO 2010/090049 A. Further, after the DDR type zeolite crystal is produced by the method for producing a DDR type zeolite crystal of the invention, it is preferable that the DDR type zeolite crystal obtained by the method for producing a DDR type zeolite crystal of the invention be used as a seed crystal. Further, it is preferable that the DDR type zeolite be pulverized using a ball mill, a bead mill, or the like to obtain a DDR type zeolite seed crystal having a desired average particle diameter. In particular, a bead mill is preferably used in pulverization.

(1-3) Washing Step:

It is preferable that the method for producing a DDR type zeolite crystal of this embodiment include a washing step of washing the generated DDR type zeolite crystal with water after the DDR type zeolite crystal generating step. The washing method in the washing step is not particularly limited, but for example, it is preferable to use a method of performing washing in such a manner that pure water is added to a product containing DDR type zeolite crystals obtained in the DDR type zeolite crystal generating step and then centrifugal separation is performed.

(2) Method for Producing DDR Type Zeolite Membrane:

An embodiment of the method for producing a DDR type zeolite membrane of the invention includes a raw material solution preparing step and a membrane forming step. The raw material solution preparing step is a step of preparing a raw material solution "by mixing at least silica, water, an organic solvent, and 1-adamantanamine that is a structure directing agent." In addition, in the raw material solution preparing step, the organic solvent is an organic solvent containing no amine, and the raw material solution is a raw material solution containing no PRTR substance. The membrane forming step is a step of immersing a support with a DDR type zeolite seed crystal adhered on the surface thereof in the raw material solution and then performing hydrothermal synthesis to form a DDR type zeolite membrane on the surface of the support. In the method for producing a DDR type zeolite membrane of this embodiment, since the "organic solvent containing no amine" is mixed in the raw material solution preparing step, 1-adamantanamine that is a structure directing agent is easily dissolved by the "organic solvent containing no amine." Further, since the "organic solvent containing no amine" used for accelerating the dissolving of 1-adamantanamine does "not contain amine," it is possible to dissolve 1-adamantanamine without using ethylenediamine or the like that is a PRTR substance. In addition, since the raw material solution does not contain a PRTR substance, the method for producing a DDR type zeolite membrane of the invention is a production method in which a PRTR substance is neither incorporated nor released.

(2-1) Raw Material Solution Preparing Step:

It is preferable that the raw material solution preparing step in the method for producing a DDR type zeolite membrane of this embodiment be the same as the raw material solution preparing step in the method for producing "a DDR type zeolite crystal" of the invention mentioned above.

(2-2) Membrane Forming Step:

In the method for producing a DDR type zeolite membrane of this embodiment, the membrane forming step is, as described above, a step of immersing a support with a DDR type zeolite seed crystal adhered on the surface thereof in the raw material solution and then performing hydrothermal synthesis to form a DDR type zeolite membrane on the surface of the support.

It is preferable that the "support with a DDR type zeolite seed crystal adhered on the surface thereof" be produced by applying a slurry containing a DDR type zeolite seed crystal onto the surface of the support and drying the slurry. The slurry containing a DDR type zeolite seed crystal is preferably a slurry containing a DDR type zeolite seed crystal dispersed in an alcohol. As an alcohol, ethanol is preferable. The content of the DDR type zeolite seed crystal in the slurry is preferably 0.001 to 0.5 mass %, more preferably 0.005 to 0.3 mass %, and particularly preferably 0.01 to 0.2 mass %. When the content thereof is less than 0.001 mass %, the DDR type zeolite membrane may non-uniformly grow in some cases. When the content thereof is more than 0.5 mass %, the thickness of the DDR type zeolite membrane may increase in some cases.

The support is preferably porous (a porous support). The porous support is preferably formed of ceramic. As the ceramic configuring the porous support, alumina, mullite, cordierite, silicon carbide, titania, zirconia, glass, and a composite of these components can be exemplified. The shape of the porous support is not particularly limited, and an arbitrary shape can be employed according to the use. For example, a plate shape, a cylindrical shape, a honeycomb shape, and a monolith shape can be exemplified. Among these, a honeycomb shape or a monolith shape is preferable. These shapes enable to increase a membrane area per unit volume. Incidentally, the "monolith shape" means a pillar shape having a plurality of through-holes "which functions as fluid passages, extends over the entire length between both the end faces, and is open at both the end faces." For example, a shape in which a cross section perpendicular to the through-hole extension direction has a shape of "a cross section perpendicular to the extension direction of voids" of a lotus root can be exemplified.

The method for producing a porous support is not particularly limited, and a known method can be used. For example, the following method can be exemplified. First, a forming raw material containing a predetermined ceramic raw material is kneaded and then extruded using a die with which a monolith-shaped formed body can be formed, thereby obtaining a monolith-shaped formed body. Thereafter, the monolith-shaped formed body is dried and fired to obtain a monolith-shaped porous support.

After the "support with a DDR type zeolite seed crystal adhered on the surface thereof" is produced, the "support with a DDR type zeolite seed crystal adhered on the surface thereof" is immersed in the raw material solution. After that, hydrothermal synthesis is performed to form a DDR type zeolite membrane on the surface of the support. The DDR type zeolite membrane to be formed on the surface of the support is obtained by the growth of a plurality of DDR type zeolite seed crystals in a membrane form on the surface of the support by hydrothermal synthesis.

Specifically, it is preferable to form a DDR type zeolite membrane on the surface of the support by putting the "support with a DDR type zeolite seed crystal adhered on the surface thereof" in a pressure resistant container or the like containing the raw material solution, and subjecting the support to hydrothermal synthesis by heating.

The temperature condition upon hydrothermal synthesis is preferably 100 to 180° C., more preferably 120 to 160° C., and particularly preferably 120 to 150° C. When the hydrothermal synthesis is performed at a temperature lower than 100° C., a time necessary for forming a DDR type zeolite membrane may be significantly increased. When the hydrothermal synthesis is performed at a temperature exceeding 180° C., a crystal phase different from DDR type zeolite may be formed in some cases. The time for hydrothermal synthesis varies depending on the amount of the DDR type zeolite seed crystals, but is preferably 10 hours or longer, more preferably 10 to 50 hours, and particularly preferably 10 to 40 hours.

The method for producing a DDR type zeolite membrane of this embodiment preferably includes a structure directing agent removing step for removing a structure directing agent after the membrane forming step. The structure directing agent removing step is preferably a step of heating a "porous support having a DDR type zeolite membrane (DDR type zeolite membrane containing 1-adamantanamine) formed thereon" at 425 to 600° C. for 15 to 200 hours. The heating temperature is more preferably 440 to 550° C. and particularly preferably 440 to 500° C. The heating time is more preferably 15 to 100 hours and particularly preferably 15 to 50 hours. Accordingly, 1-adamantanamine is combusted and removed and thus it is possible to obtain a DDR type zeolite membrane (DDR type zeolite membrane containing no 1-adamantanamine) disposed on the wall faces of the cells of the porous support. When the heating temperature is lower than 425° C., the structure directing agent may not be removed sufficiently in some cases. Further, when the heating temperature is higher than 600° C., the DDR type zeolite membrane may be broken in some cases. When the heating time is shorter than 15 hours, the structure directing agent may not be removed sufficiently in some cases. Further, when heating time is longer than 200 hours, the DDR type zeolite membrane may be broken and production costs may also increase in some cases.

The thickness of the DDR type zeolite membrane (DDR type zeolite membrane containing no 1-adamantanamine) formed on the surface of the support is preferably 0.5 to 4 µm, more preferably 0.5 to 2 and particularly preferably 0.5 to 1 µm. When the thickness is more than 4 µm, the permeation rate at which fluid to be treated passes through the DDR type zeolite membrane to be obtained may become low, and this may cause generation of defects upon detachment of a structure directing agent. When the thickness is less than 0.5 µm, the separation performance of the DDR type zeolite membrane to be obtained may deteriorate. The membrane thickness of the DDR type zeolite membrane (DDR type zeolite membrane containing no 1-adamantanamine) is an average value of the membrane thickness at five points in a cross section, measured by an electron micrograph of a cross section taken along the thickness direction.

EXAMPLES

Hereinafter, the invention will be described in more detail by means of Examples, but the invention is not limited to these Examples.

Example 1

After 9.97 g of ethanol (produced by AMAKASU CHEMICAL INDUSTRIES) was put in a 250 cm$^3$ fluorine resin airtight container, 1.98 g of 1-adamantanamine (produced by Sigma-Aldrich Co. LLC) was added thereto to completely dissolve the 1-adamantanamine by shaking using a shaker. As ethanol, an aqueous solution of ethanol having an ethanol concentration of 95 mass % (a mixed solution of ethanol and water, the mixed solution containing no amine) was used. 149.47 g of an aqueous solution containing 0.500 mass % of DDR type zeolite fine crystals as nuclei (nuclei-containing solution) was put in another container, and 97.90 g of silica sol (SNOWTEX S, produced by Nissan Chemical Industries, Ltd.) containing 30 mass % of silica was added thereto and stirred to obtain "silica sol containing nuclei." Here, "nuclei" indicate fine crystals that are nuclei of crystal growth of the DDR type zeolite crystals. Thereafter, the obtained "silica sol containing nuclei" was quickly put in the previously prepared airtight container containing "ethanol containing 1-adamantanamine dissolved therein" (1-ADA ethanol solution), and the mixed liquid was shaken by a shaker until the mixed liquid in the airtight container became transparent. Thus, a raw material solution (raw material sol) was obtained. The period of shaking time was 1 hour. The raw material solution did not contain a PRTR substance. The "1-ADA organic solvent solution dissolving method" shown in Table 1 is a method of dissolving the "organic solvent containing 1-adamantanamine dissolved therein" in the "silica sol containing nuclei." In Example 1, ethanol is used as an organic solvent.

The value of the ratio of the "content expressed in terms of mole" of the water in the raw material solution to the "content expressed in terms of mole" of the organic solvent type zeolite crystals. Specifically, some of the crystals after washing were dried overnight at 80° C. to obtain a dried powder. Then, the crystal phase of the dried powder thus obtained was checked by the XRD measurement (powder X-ray diffraction measurement). Some of production conditions and products are shown in Table 1. In Table 1, "1-ADA" means "1-adamantanamine."

TABLE 1

| | Organic solvent | 1-ADA organic solvent solution dissolving method | Raw material solution composition (molar ratio) | | | | Water/Organic solvent (mole/mole) | Silica/Organic solvent (mole/mole) | Hydrothermal synthesis condition | | Product |
|---|---|---|---|---|---|---|---|---|---|---|---|
| | | | Silica | 1-ADA | Organic solvent | Water | | | Temperature (° C.) | Time (hour) | |
| Example 1 | Ethanol | Shaking | 1 | 0.027 | 0.44 | 24 | 54.5 | 2.3 | 160 | 16 | DDR |
| Example 2 | Ethanol | Shaking | 1 | 0.016 | 0.26 | 21 | 80.8 | 3.8 | 160 | 16 | DDR |
| Example 3 | Ethanol | Shaking | 1 | 0.027 | 0.89 | 23.2 | 26.1 | 1.1 | 160 | 16 | DDR |
| Example 4 | Ethanol | Shaking | 1 | 0.027 | 1.33 | 21.6 | 16.2 | 0.8 | 160 | 16 | DDR + amorphous |
| Example 5 | Ethanol | Shaking | 1 | 0.027 | 2.21 | 18.4 | 8.3 | 0.5 | 160 | 16 | DDR + amorphous |
| Example 6 | Ethanol | Standing at room temperature | 1 | 0.027 | 0.44 | 24 | 54.5 | 2.3 | 120 | 16 | DDR |
| Example 7 | Ethanol | Standing at room temperature | 1 | 0.027 | 0.44 | 24 | 54.5 | 2.3 | 140 | 16 | DDR |
| Example 8 | Ethanol | Standing at room temperature | 1 | 0.027 | 0.44 | 24 | 54.5 | 2.3 | 138 | 20 | DDR |
| Example 9 | EG | Shaking | 1 | 0.027 | 0.37 | 24.7 | 66.8 | 2.7 | 160 | 12 | DDR |
| Example 10 | Acetone | Standing at room temperature | 1 | 0.039 | 0.70 | 24.7 | 35.3 | 1.4 | 150 | 10 | DDR | in the raw material solution was 54.5. Further, the value of the ratio of the "content expressed in terms of mole" of the silica in the raw material solution to the "content expressed in terms of mole" of the organic solvent in the raw material solution was 2.3.

The DDR type zeolite fine crystals used as nuclei were obtained by preparing a DDR type zeolite powder on the basis of the method described in WO 2010/090049 A and pulverizing the powder. The method for preparing nuclei from the DDR type zeolite powder was specifically as follows. The DDR type zeolite crystals having a specific surface area of 16.07 m$^2$/g were subjected to a pulverization treatment for 120 minutes by a bead mill (trade name: Star Mill) manufactured by Ashizawa Finetech, Ltd. After the pulverization treatment, centrifugal separation was performed at 3,000 rpm for 15 minutes to remove coarse particles. Thus, nuclei having a specific surface area of 106 m$^2$/g were obtained.

Next, DDR type zeolite crystals were generated by performing heating (hydrothermal synthesis) on the raw material solution. Specifically, the raw material solution was put in a stainless steel pressure resistant container provided with a fluorine resin inner cylinder having an inner volume of 300 cm$^3$. Then, the raw material solution in the container was heated at 160° C. for 16 hours in a stationary state (subjected to hydrothermal synthesis). After the hydrothermal synthesis, washing was performed by performing "a process in which pure water was added to a solution with crystals (DDR type zeolite crystals) dispersed therein and centrifugal separation was performed" twice.

From the result obtained by the XRD measurement (powder X-ray diffraction measurement) of the obtained crystals (products), the obtained crystals were confirmed to be DDR Example 2

In the preparation of the raw material solution, the added amount of ethanol was set to 5.38 g and the added amount of 1-adamantanamine was set to 1.073 g. Further, the concentration of nuclei in the "silica sol containing nuclei" was set to 0.690 mass % and the added amount of the "silica sol containing nuclei" was set to 108.91 g. Furthermore, the added amount of the "silica sol containing 30 mass % of silica" was set to 90.95 g. Conditions other than the above-described conditions were the same as in Example 1, thereby obtaining DDR type zeolite crystals. The value of the ratio of the "content expressed in terms of mole" of the water in the raw material solution to the "content expressed in terms of mole" of the organic solvent in the raw material solution was 80.8. Further, the value of the ratio of the "content expressed in terms of mole" of the silica in the raw material solution to the "content expressed in terms of mole" of the organic solvent in the raw material solution was 3.8. Some of production conditions and products are shown in Table 1.

Example 3

After 6.64 g of ethanol (produced by AMAKASU CHEMICAL INDUSTRIES) was put in a 100 cm$^3$ fluorine resin airtight container, 0.66 g of 1-adamantanamine (produced by Sigma-Aldrich Co. LLC) was added thereto to completely dissolve the 1-adamantanamine by shaking using a shaker. As ethanol, an aqueous solution of ethanol having an ethanol concentration of 95 mass % (a mixed solution of ethanol and water, the mixed solution containing no amine) was used. 46.49 g of an aqueous solution containing 0.536 mass % of DDR type zeolite fine crystals as nuclei (nuclei-containing solution) was put in another container, and 32.63 g of silica sol (SNOWTEX S, produced by Nissan Chemical Industries, Ltd.) containing 30 mass % of silica was added thereto and stirred to obtain "silica sol containing nuclei." Thereafter, the obtained "silica sol containing nuclei" was quickly put in the previously prepared airtight container containing "ethanol containing 1-adamantanamine dissolved therein," and the mixed liquid was shaken by a shaker until the mixed liquid in the airtight container became transparent, thereby obtaining a raw material solution (raw material sol). The period of shaking time was 1 hour. The raw material solution did not contain a PRTR substance.

The value of the ratio of the "content expressed in terms of mole" of the water in the raw material solution to the "content expressed in terms of mole" of the organic solvent in the raw material solution was 26.1. Further, the "content expressed in terms of mole" of the silica in the raw material solution to the "content expressed in terms of mole" of the organic solvent in the raw material solution was 1.1.

The DDR type zeolite fine crystals used as nuclei were the same as those used in Example 1.

Next, DDR type zeolite crystals were generated by performing heating (hydrothermal synthesis) on the raw material solution. The specific method was the same as in Example 1, except that the raw material solution was put in a stainless steel pressure resistant container provided with a fluorine resin inner cylinder having an inner volume of 100 cm$^3$.

From the result obtained by the XRD measurement (powder X-ray diffraction measurement) of the obtained crystals (products) in the same manner as in the case of Example 1, the obtained crystals were confirmed to be DDR type zeolite crystals. Some of production conditions and products are shown in Table 1.

Example 4

In the preparation of the raw material solution, the added amount of ethanol was set to 9.97 g, the concentration of nuclei in the "silica sol containing nuclei" was set to 0.625 mass %, and the added amount of the "silica sol containing nuclei" was set to 39.85 g. DDR type zeolite crystals were obtained in the same manner as in Example 3, except for the conditions other than the above-described conditions. The value of the ratio of the "content expressed in terms of mole" of the water in the raw material solution to the "content expressed in terms of mole" of the organic solvent in the raw material solution was 16.2. Further, the value of the ratio of the "content expressed in terms of mole" of the silica in the raw material solution to the "content expressed in terms of mole" of the organic solvent in the raw material solution was 0.8. Some of production conditions and products are shown in Table 1. The "DDR+amorphous" in the section "Product" in Table 1 means a mixture of DDR crystals and amorphous silica.

Example 5

In the preparation of the raw material solution, the added amount of ethanol was set to 16.61 g, the concentration of nuclei in the "silica sol containing nuclei" was set to 0.938 mass %, and the added amount of the "silica sol containing nuclei" was set to 2.56 g. DDR type zeolite crystals were obtained in the same manner as in Example 3, except for the conditions other than the above-described conditions. The value of the ratio of the "content expressed in terms of mole" of the water in the raw material solution to the "content expressed in terms of mole" of the organic solvent in the raw material solution was 8.3. Further, the value of the ratio of the "content expressed in terms of mole" of the silica in the raw material solution to the "content expressed in terms of mole" of the organic solvent in the raw material solution was 0.5. Some of production conditions and products are shown in Table 1.

Example 6

DDR type zeolite crystals were obtained in the same manner as in Example 1, except that the "1-ADA ethanol solution dissolving method" was set to "standing at room temperature" and the hydrothermal synthesis was performed at 120° C. for 16 hours. Some of production conditions and products are shown in Table 1.

Example 7

DDR type zeolite crystals were obtained in the same manner as in Example 6, except that the hydrothermal synthesis was performed at 140° C. for 16 hours. Some of production conditions and products are shown in Table 1.

Example 8

In the generation of DDR type zeolite crystals by performing heating (hydrothermal synthesis) on the raw material solution, the heating temperature and the heating time were set to 138° C. and 20 hours. In addition, the "1-ADA ethanol solution dissolving method" was set to "standing at room temperature." DDR type zeolite crystals were obtained in the same manner as in Example 1, except for the conditions other than the above-described conditions. Some of production conditions and products are shown in Table 1.

Example 9

2.60 g of ethylene glycol (EG) (produced by Kishida Chemical Co., Ltd.) was put in a 100 cm$^3$ fluorine resin airtight container. Thereafter, 0.454 g of 1-adamantanamine (produced by Sigma-Aldrich Co. LLC) was further added to the container to completely dissolve the 1-adamantanamine by shaking using a shaker. 34.25 g of an aqueous solution containing 0.500 mass % of DDR type zeolite fine crystals as nuclei (nuclei-containing solution) was put in another container, and 22.418 g of silica sol (SNOWTEX S, produced by Nissan Chemical Industries, Ltd.) containing 30 mass % of silica was added thereto and stirred to obtain "silica sol containing nuclei." Thereafter, the obtained "silica sol containing nuclei" was quickly put in the previously prepared airtight container containing "ethylene glycol containing 1-adamantanamine dissolved therein," and the mixed liquid was shaken by a shaker until the mixed liquid in the airtight container became transparent, thereby obtaining a raw material solution (raw material sol). The period of shaking time was 70 minutes. The raw material solution did not contain a PRTR substance. In Example 9, ethylene glycol (EG) is used as an organic solvent.

The value of the ratio of the "content expressed in terms of mole" of the water in the raw material solution to the "content expressed in terms of mole" of the organic solvent in the raw material solution was 66.8. Further, the value of the ratio of the "content expressed in terms of mole" of the silica in the raw material solution to the "content expressed in terms of mole" of the organic solvent in the raw material solution was 2.7.

The DDR type zeolite fine crystals used as nuclei were the same as those used in Example 1.

Next, DDR type zeolite crystals were generated by performing heating (hydrothermal synthesis) on the raw material solution. The specific method was the same as in Example 1, except that the raw material solution was put in a stainless steel pressure resistant container provided with a fluorine resin inner cylinder having an inner volume of 80 cm$^3$. Some of production conditions and products are shown in Table 1.

Example 10

DDR type zeolite crystals were generated in the same manner as in Example 3, except that ethanol in the raw material solution was changed to acetone (produced by Kishida Chemical Co., Ltd.) and the "1-ADA ethanol solution dissolving method" was set to "standing at room temperature." Some of production conditions and products are shown in Table 1. In Example 10, acetone is used as an organic solvent.

Example 11

Seeding slurry was prepared by dispersing 0.08 g of the DDR type zeolite crystals obtained in Example 1 in 130 g of ethanol.

Next, a monolith-shaped porous support was placed such that one end face was oriented to the upper side of the vertical direction. Then, on the upper side of the one end face of the porous support, a "wide-mouth funnel" having a wide outlet was disposed. The diameter of the outlet of the wide-mouth funnel was approximately the same as the diameter of the one end face of the porous support. Then, the obtained seeding slurry was poured into the wide-mouth funnel, and the seeding slurry flowed out of the outlet of the wide-mouth funnel was poured into cells of the monolith-shaped porous support. Then, the seeding slurry was allowed to pass through the cells of the porous support (seeding slurry falling operation). The seeding slurry poured into the cells of the porous support was 160 cm$^3$. The porous support was in a round pillar shape having a bottom face diameter of 30 mm and a length in the central axial direction of 160 mm. In addition, 61 cells "extending from one end face to the other end face and being open in both end faces" were formed in the porous support. Then, the diameter of a cross section perpendicular to the central axial direction of the cell (diameter of the cell) was 2.14 mm. In addition, the average pore diameter of the porous support was 0.1 μm. In addition, in the porous support, an alumina layer was formed on a surface of the alumina substrate.

After the seeding slurry was poured into the cells of the porous support to apply the seeding slurry (DDR type zeolite seed crystals) on the wall faces in the cells, air was sent in the cells at a wind velocity of 2 to 7 m/sec. The operation of sending air in the cells was performed at room temperature. In addition, the time for sending the air in the cells was 10 minutes. Accordingly, the seeding slurry applied on the wall faces in the cells was dried (drying operation).

A series of the above-described "seeding slurry falling operation" and "drying operation" each being performed once was defined as "one cycle operation," and such "one cycle operation" was performed twice in total to obtain a seed crystal-adhered porous support.

After 5.382 g of ethanol (produced by AMAKASU CHEMICAL INDUSTRIES) was put in a fluorine resin container, 1.073 g of 1-adamantanamine (produced by Sigma-Aldrich Co. LLC) was added thereto to completely dissolve the 1-adamantanamine. 90.95 g of silica sol (SNOWTEX S, produced by Nissan Chemical Industries, Ltd.) containing 30 mass % of silica and 108.2 g of ion-exchanged water were put in another container, and stirred for 1 minute to prepare a silica dispersion liquid. Thereafter, the previously prepared ethanol solution containing 1-adamantanamine dissolved therein was added to the silica dispersion liquid, and the mixed liquid was stirred for 90 minutes by a shaker, thereby obtaining a raw material solution for forming a membrane.

The seed crystal-adhered porous support was disposed in a stainless steel pressure resistant container provided with a fluorine resin inner cylinder having a capacity of 300 cm$^3$, and the prepared raw material solution for forming a membrane was put in the container to perform a heating treatment (hydrothermal synthesis) at 138° C. (synthesis temperature) for 30 hours (synthesis time). Thus, a DDR type zeolite membrane (DDR type zeolite membrane containing 1-adamantanamine) was formed on the wall faces in the cells of the porous support. Thereafter, a porous support having the DDR type zeolite membrane (DDR type zeolite membrane containing 1-adamantanamine) formed thereon was taken out and washed with water for 72 hours.

The obtained "porous support having the DDR type zeolite membrane (DDR type zeolite membrane containing 1-adamantanamine) formed thereon" was heated at 450° C. for 50 hours. Thus, 1-adamantanamine was combusted and removed to obtain a DDR type zeolite membrane (DDR type zeolite membrane containing no 1-adamantanamine) disposed on the wall faces of the cells of the porous support.

It was checked that the obtained membrane was the DDR type zeolite membrane by the XRD measurement (powder X-ray diffraction measurement).

As seen from Examples 1 to 6, it is found that, when the organic solvent is contained in the raw material solution, it is possible to easily dissolve 1-adamantanamine without using a PRTR substance and to obtain DDR type zeolite crystals. Further, as seen from Example 7, it is found that, when the organic solvent is contained in the raw material solution for forming a membrane, it is possible to easily dissolve 1-adamantanamine without using a PRTR substance and to obtain a DDR type zeolite membrane. As seen from Examples 4 and 5, it is found that, when the amount of ethanol is large, DDR type zeolite crystals and amorphous silica are generated.

INDUSTRIAL APPLICABILITY

The method for producing a DDR type zeolite crystal of the invention can be preferably used for producing a DDR type zeolite crystal. The method for producing a DDR type zeolite membrane of the invention can be preferably used for producing a DDR type zeolite membrane.

The invention claimed is:
1. A method for producing a DDR zeolite crystal, the method comprising:
a raw material solution preparing step of preparing a raw material solution by mixing at least silica, water, an organic solvent, and 1-adamantanamine that is a structure directing agent; and
a DDR zeolite crystal generating step of generating a DDR zeolite crystal by performing a heating treatment on the raw material solution, wherein the organic solvent is an organic solvent containing no amine, the raw material solution is a raw material solution containing no ethylenediamine and potassium fluoride, and a value of the ratio of the content expressed in terms of mole of the silica in the raw material solution to the content expressed in terms of mole of the organic solvent in the raw material solution is 1 to 6, and wherein in the DDR zeolite crystal generating step, a DDR zeolite seed crystal is dispersed in the raw material solution and then the raw material solution is subjected to the heating treatment.

2. The method for producing a DDR zeolite crystal according to claim 1, wherein the organic solvent contains 70 mol % or more of an alcohol having 5 or less carbon atoms, acetone, or a mixture of an alcohol having 5 or less carbon atoms and acetone.

3. The method for producing a DDR zeolite crystal according to claim 2, wherein the organic solvent is an alcohol having 3 or less carbon atoms.

4. The method for producing a DDR zeolite crystal according to claim 2, wherein the alcohol is a monohydric or dihydric alcohol.

5. The method for producing a DDR zeolite crystal according to claim 2, wherein the alcohol is ethanol or ethylene glycol.

6. The method for producing a DDR zeolite crystal according to claim 1, wherein a value of the ratio of the content expressed in terms of mole of the water in the raw material solution to the content expressed in terms of mole of the organic solvent in the raw material solution is 6 or more.

7. The method for producing a DDR zeolite crystal according to claim 6, wherein a value of the ratio of the content expressed in terms of mole of the water in the raw material solution to the content expressed in terms of mole of the organic solvent in the raw material solution is 6 to 100.

8. The method for producing a DDR zeolite crystal according to claim 1, wherein in the raw material solution preparing step, the 1-adamantanamine that is a structure directing agent is dissolved in the organic solvent to prepare an organic solvent containing 1-adamantanamine dissolved therein, and the organic solvent containing 1-adamantanamine dissolved therein, the silica, and the water are mixed.

9. A method for producing a DDR zeolite membrane, comprising:

adhering DDR zeolite crystals obtained by the method of claim 1 on a support;

preparing a raw material solution for forming a membrane by mixing at least silica, water, an organic solvent, and 1-adamantanamine that is a structure directing agent; and immersing the support in the raw material solution for forming a membrane and then performing hydrothermal synthesis to form a DDR zeolite membrane on the surface of the support, wherein the organic solvent in the raw material solution for forming a membrane is an organic solvent containing no amine, the raw material solution for forming a membrane is a raw material solution containing no ethylenediamine and potassium fluoride, and a value of the ratio of the content expressed in terms of mole of the silica in the raw material solution for forming a membrane to the content expressed in terms of mole of the organic solvent in the raw material solution for forming a membrane is 1 to 6.

* * * * *